(12) United States Patent
Berry et al.

(10) Patent No.: US 11,217,983 B2
(45) Date of Patent: Jan. 4, 2022

(54) GALLOPING MOTION DISRUPTORS AND METHODS FOR REDUCING CONDUCTOR GALLOPING

(71) Applicant: AFL Telecommunications LLC, Duncan, SC (US)

(72) Inventors: Samuel Berry, Greenville, SC (US); Steven Kranz, Moore, SC (US)

(73) Assignee: AFL Telecommunications LLC, Duncan, SC (US)

( * ) Notice: Subject to any disclaimer, the term of this patent is extended or adjusted under 35 U.S.C. 154(b) by 347 days.

(21) Appl. No.: 16/375,296

(22) Filed: Apr. 4, 2019

(65) Prior Publication Data

US 2020/0321764 A1 Oct. 8, 2020

(51) Int. Cl.
*H02G 7/14* (2006.01)
*H02G 7/02* (2006.01)
*H02G 7/06* (2006.01)

(52) U.S. Cl.
CPC .............. *H02G 7/14* (2013.01); *H02G 7/02* (2013.01); *H02G 7/06* (2013.01)

(58) Field of Classification Search
CPC .. H02G 7/14; H02G 7/02; H02G 7/06; H02G 7/00; H02G 7/05; H02G 7/056; F16G 15/02; H01R 11/14; B25B 25/00; H01B 9/008; H01B 17/12; H01B 17/22; Y10T 29/49881; F16L 3/00; Y10S 174/12

USPC ......... 174/42, 173, 160, 270, 207, 273, 184, 174/40 TD, 40 CC, DIG. 12, 79, 43, 148, 174/150, 208, 141 R, 155; 248/63
See application file for complete search history.

(56) References Cited

U.S. PATENT DOCUMENTS

| | | | | |
|---|---|---|---|---|
| 445,790 | A * | 2/1891 | Winton .................. | H01B 17/12 174/183 |
| 3,288,918 | A * | 11/1966 | Schlein .................. | H01B 17/22 174/173 |
| 4,620,059 | A * | 10/1986 | Sherman .................. | H02G 7/14 174/42 |
| 5,515,582 | A * | 5/1996 | Trowbridge ............ | F16G 11/02 24/131 R |
| 6,372,984 | B1 | 4/2002 | Wang | |

* cited by examiner

*Primary Examiner* — Roshn K Varghese
(74) *Attorney, Agent, or Firm* — Dority & Manning, P.A.

(57) ABSTRACT

Galloping motion disruptors and methods for reducing conductor galloping are provided. A galloping motion disruptor includes a first disruptor rod and a second disruptor rod. Each of the first and second disruptor rods includes a first end portion, a second end portion, and a mid-section between the first end portion and the second end portion. The first end portion includes a helical gripping section. The second end portion includes a hook section. The hook sections of the first and second disruptor rods are connectable to each other.

17 Claims, 2 Drawing Sheets

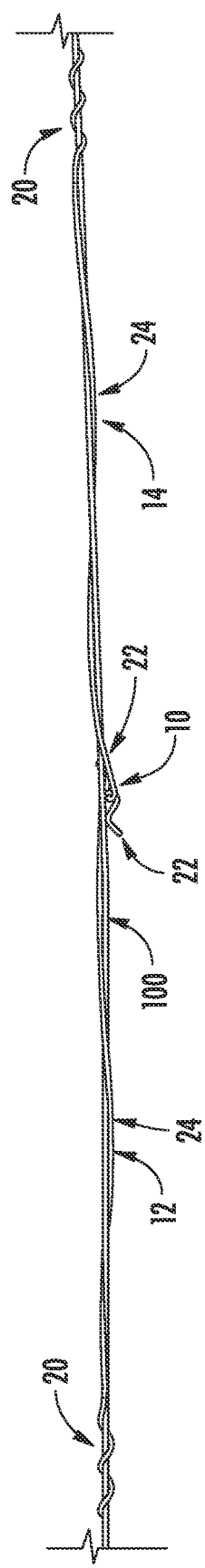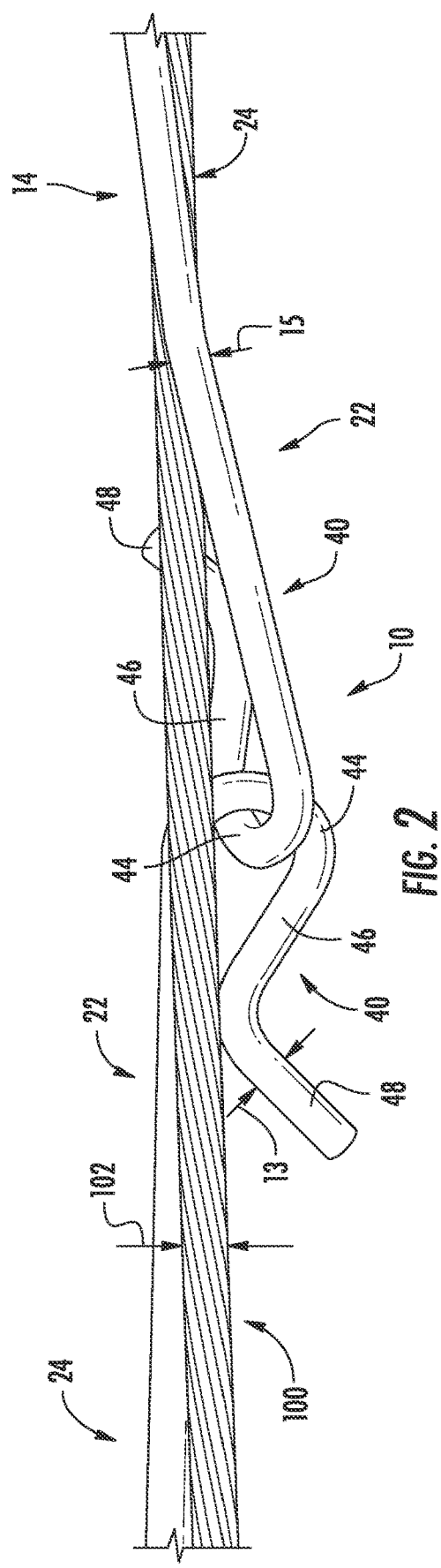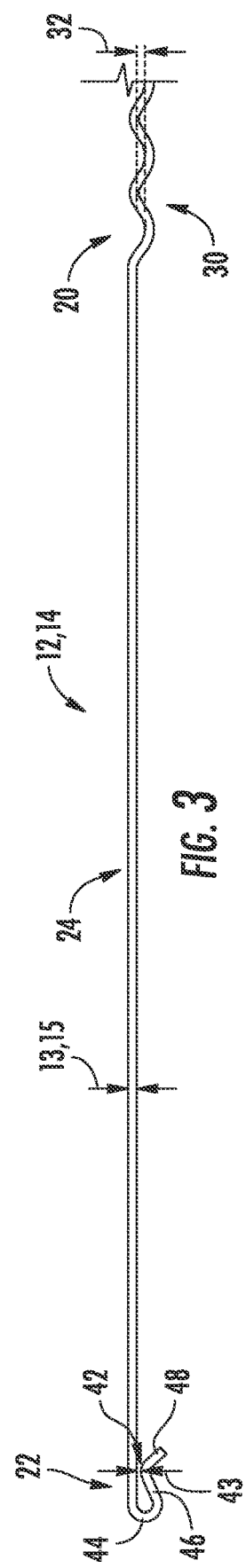

GALLOPING MOTION DISRUPTORS AND METHODS FOR REDUCING CONDUCTOR GALLOPING

FIELD

The present disclosure relates generally to overhead conductors, and more particularly to galloping motion disruptors for conductor galloping reduction as well as methods for reducing conductor galloping.

BACKGROUND

Overhead conductors are exposed to several types of vibration during use, including for example aeolean vibration, wake induced oscillation, and galloping. Galloping is generally low frequency, high amplitude oscillation, as opposed to the high frequency, low amplitude vibration which characterizes aeolean vibration and the moderate frequency, moderate amplitude vibration which characterizes wake induced oscillation. Galloping can be caused, for example, by wind power acting on the conductor. Conductors which have ice or wet snow buildup are particularly vulnerable to galloping.

Various devices and methods are known in the industry for reducing conductor oscillation, and in particular for reducing galloping. For example, one known conductor galloping control device is a single, long preformed rod which is wrapped around the conductor.

However, such known devices suffer from deficiencies. For example, the lengths of such known rods make manufacturing difficult and inefficient, make transportation of the rods unwieldy, and make installation of the rods difficult and time-consuming. Additionally, associated costs are increased due to these difficulties. Further, while galloping reduction is achieved through use of such devices, further improvements in galloping reduction levels are desirable.

Accordingly, improved methods and devices for reducing conductor galloping are desired. In particular, methods and devices which provide improved galloping reduction and/or which facilitate easier, more efficient manufacturing, transportation, and installation would be desired.

BRIEF DESCRIPTION

Aspects and advantages of the invention will be set forth in part in the following description, or may be obvious from the description, or may be learned through practice of the invention.

In accordance with some embodiments, a galloping motion disruptor is provided. The galloping motion disruptor includes a first disruptor rod and a second disruptor rod. Each of the first and second disruptor rods includes a first end portion, a second end portion, and a mid-section between the first end portion and the second end portion. The first end portion includes a helical gripping section. The second end portion includes a hook section. The hook sections of the first and second disruptor rods are connectable to each other.

In accordance with other embodiments, a method for reducing conductor galloping is provided. The method includes attaching a helical gripping section of a first disruptor rod on the conductor. The first disruptor rod includes a first end portion, a second end portion, and a mid-section between the first end portion and the second end portion. The first end portion includes the helical gripping section. The second end portion includes a hook section. The method further includes attaching a helical gripping section of a second disruptor rod on the conductor. The second disruptor rod includes a first end portion, a second end portion, and a mid-section between the first end portion and the second end portion. The first end portion includes the helical gripping section. The second end portion includes a hook section. The method further includes connecting the hook sections of the first and second disruptor rods together. The method further includes wrapping the mid-sections of the first and second disruptor rods around the conductor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF FIGURES

A full and enabling disclosure of the present invention, including the best mode thereof, directed to one of ordinary skill in the art, is set forth in the specification, which makes reference to the appended figures, in which:

FIG. 1 is a side view of a galloping motion disruptor installed on a conductor in accordance with embodiments of the present disclosure;

FIG. 2 is a close-up side view of a portion of a galloping motion disruptor installed on a conductor in accordance with embodiments of the present disclosure;

FIG. 3 is a side view of a disruptor rod of a galloping motion disruptor in accordance with embodiments of the present disclosure;

DETAILED DESCRIPTION

Figure 4:
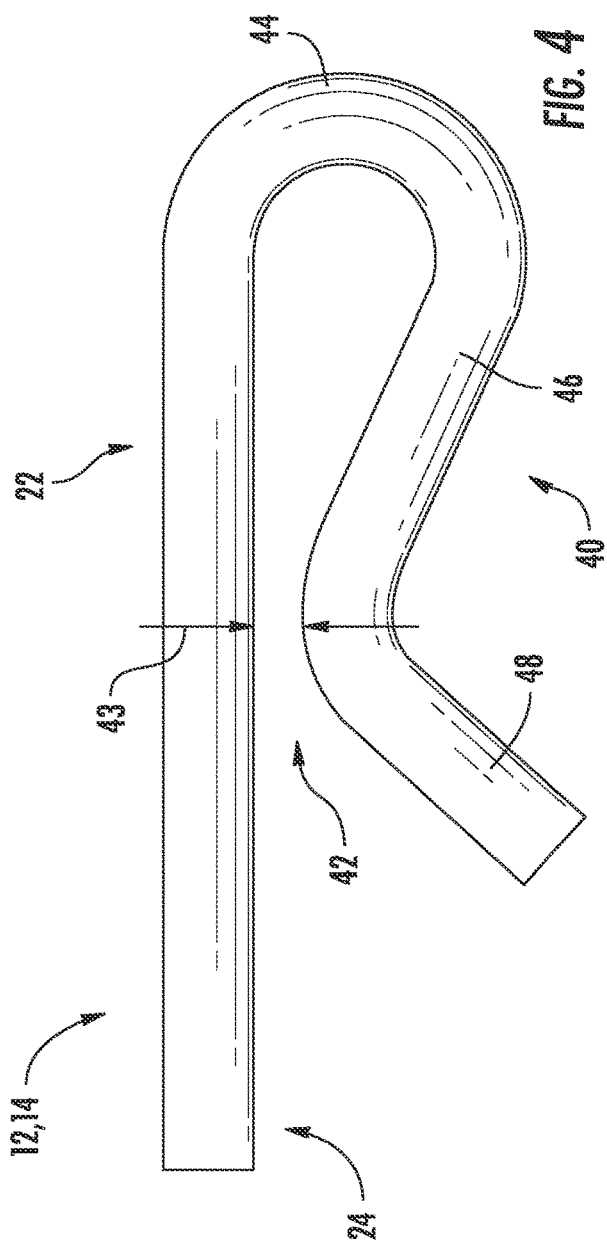
FIG. 4 is a close-up side view of a second end portion, including a hook section, of a disruptor rod of a galloping motion disruptor in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIGS. 1 through 5, the present disclosure is generally directed to improved galloping motion disruptors 10, as well as to improved methods for reducing conductor 100 galloping. Galloping motion disruptors 10 and methods in accordance with the present disclosure may be utilized with any suitable conductors 100, and in particular overhead conductors. For example, suitable conductors include overhead cables such as ADSS, AAC, AAAC, ACSR, OPGW, OHGW, or other suitable overhead cable types. Disruptors 10 and methods in accordance with the present disclosure may advantageously provide increased galloping reduction as compared to known galloping reduction devices, and/or may facilitate easier, more efficient manufacturing, transportation, and/or installation.

As shown, a galloping motion disruptor 10 may include a first disruptor rod 12 and a second disruptor rod 14. As discussed herein, the first and second rods 14 may be connectable to each other, either directly or indirectly, to form disruptor 10. In exemplary embodiments, features of the rods 12, 14 may advantageously facilitate increased galloping reduction. Additionally, the use of connectable rods 12, 14 advantageously allows for the length of each rod 12, 14 to be reduced (in particular as compared to known control devices) while maintaining overall galloping reduction functionality, thus facilitating easier, more efficient manufacturing, transportation and/or installation.

Rods 12, 14 are generally formed from non-conductive material(s). For example, in exemplary embodiments, each rod 12, 14 is formed from a plastic, such as polyvinyl chloride. In exemplary embodiments, each rod 12, 14 is a solid rod, although in alternative embodiments each rod 12, 14 may be a hollow rod. In exemplary embodiments, rods 12, 14 are preforms. Further, in exemplary embodiments, rods 12, 14 are extruded components. For example, rods 12, 14 may advantageously be formed using a continuous process wherein the extruded component is provided in-line to a mandrel. At the mandrel, the rods 12, 14 may be wrapped around the mandrel to form the preform shapes as discussed herein.

Rods 12, 14 may each have a maximum outer diameter 13, 15, respectively. The maximum outer diameters 13, 15 may be suitable for use with particular conductors 100 having particular maximum outer diameters 102. In exemplary embodiments, the maximum outer diameters 13, 15 may be between 0.4 inches and 1.5 inches, such as between 0.5 and 1.25 inches.

Each rod 12, 14 may include a first end portion 20 which includes a first end of the rod 12, 14, and a second end portion 22 which includes a second opposite end of the rod 12, 14. Further, each rod 12, 14 may include a mid-section 24 between the first end portion 20 and second end portion 22. In exemplary embodiments, the mid-section 24 is relatively longer than both the first end portion 20 and the second end portion 22 (as measured in terms of length of the actual rod and portions thereof themselves or distance over which the various portions span).

The first end portion 20 of the first disruptor rod 12 and/or second disruptor rod 14 includes a helical gripping section 30. Helical gripping section 30 includes one or more preformed helical turns, and may define a pitch and an inner diameter 32. Inner diameter 32 is the maximum diameter of the space defined by the gripping section. In exemplary embodiments, the inner diameter 32 is constant throughout the gripping section 30, although in alternative embodiments the inner diameter 32 may increase, decrease, or otherwise fluctuate. In exemplary embodiments, a maximum inner diameter 32 defined by the gripping section 30 of the first disruptor rod 12 may be less than the maximum outer diameter 102 of the conductor 100. Additionally or alternatively, in exemplary embodiments, a maximum inner diameter 32 defined by the gripping section 30 of the second disruptor rod 14 may be less than the maximum outer diameter 102 of the conductor 100. Accordingly, an interference fit may be formed by the gripping section 30 of the first disruptor rod 12 and/or second disruptor rod 14 when attached on to the conductor 100.

The mid-section 24 of the first disruptor rod 12 and/or second disruptor rod 14 may in exemplary embodiments be a straight section of the rod 12, 14. When the rods 12, 14 are provided on a conductor, the mid-sections 24 may be wrapped around the conductor 100 in a generally helical fashion. In exemplary embodiments, a maximum pitch of the mid-section 24 of the first disruptor rod 12 when wrapped around conductor 100 may be greater than a maximum pitch of the gripping section 30 of the first disruptor rod 12, as well as of the second disruptor rod 14. In exemplary embodiments, a maximum pitch of the mid-section 24 of the second disruptor rod 14 when wrapped around conductor 100 may be greater than a maximum pitch of the gripping section 30 of the second disruptor rod 14, as well as of the first disruptor rod 12.

The second end portion 22 of the first disruptor rod 12 and/or second disruptor rod 14 includes a hook section 40. Hook section 40 includes a preformed hook-like member. A gap 42 may be defined by the hook section 40. The gap 42 may be a space between neighboring portions of the hook section 40. In exemplary embodiments, a minimum width 43 of the gap 42 in the first disruptor rod 12 may be less than a maximum diameter 13 of the first disruptor rod 12. In exemplary embodiments, a minimum width 43 of the gap 42 in the second disruptor rod 14 may be less than a maximum diameter 15 of the first disruptor rod 14.

A hook section 40 may include, for example, a curved portion 44. Hook section 40 may further include a linear portion 46 extending from a distal end of the curved portion 44. The linear portion 46 may, in exemplary embodiments, be an inwardly-extending linear portion 46 such that the gap 42 is gradually reduced in a direction towards the distal end of the linear portion 46. In some embodiments, the minimum width 43 may thus be defined at a distal end of the linear portion 48. In some embodiments, hook section 40 may further include an outwardly-extending linear portion 48 extending from a distal end of the linear portion 46, such that the gap 42 is gradually increased in a direction towards the distal end of the linear portion 48.

The use of hook sections 40 in accordance with the present disclosure is particularly advantageous both due to the ability of the hook sections 40 to connect various components of the disruptor 10 together, as discussed herein, as well as due to the additional galloping reduction abilities provided by the hook sections 40. For example, the hook sections 40 are specifically designed as additional/increased turbulence generation regions which reduce the uniformity of wind power input on the hook sections 40 and rods 12, 14, generally. This results in additional galloping reduction. Additionally, the sizes of the hook gaps relative to the rod diameters may advantageously prevent the hooks, and thus the rods 12, 14, from disengaging from each other during use.

Figure 5:
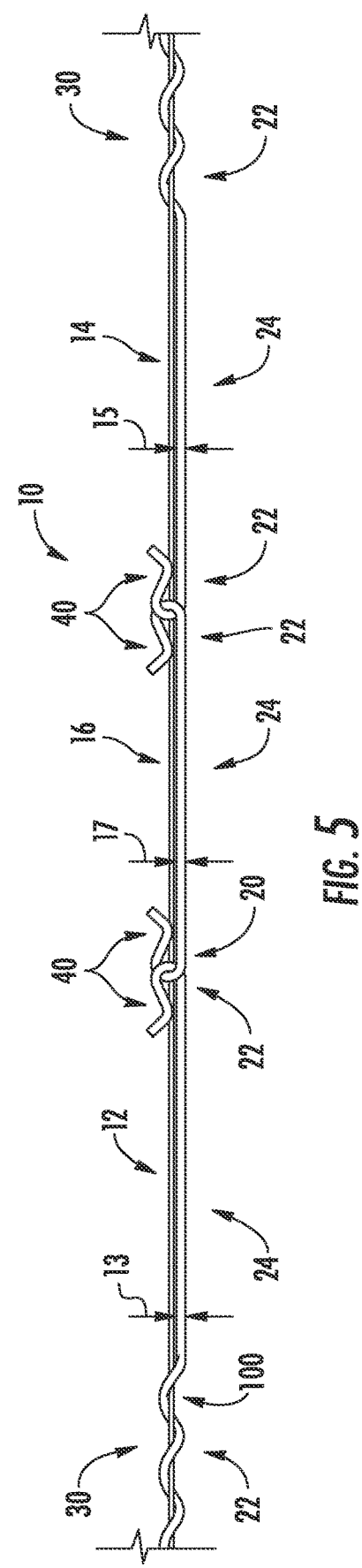
FIG. 5 is a side view of a galloping motion disruptor in accordance with embodiments of the present disclosure.

The first disruptor rod 12 and the second disruptor rod 14 may be connectable to each other to form the galloping motion disruptor 10. For example, the hook sections 40 of the rods 12, 14 may be connectable to each other. In some embodiments, as illustrated in FIGS. 1 and 2, the hook sections 40 and thus the rods 12, 14, may be directly connected together. In other embodiments, as illustrated in FIG. 5, the hook sections 40 and thus the rods 12, 14 may be indirectly connected together, such as through use of one or more extension rods 16.

Extension rod 16 may be formed from the same material as rods 12, 14, e.g. a non-conductive material(s) such as plastic, such as in exemplary embodiments polyvinyl chloride. In exemplary embodiments, extension rod 16 is a solid rod, although in alternative embodiments extension rod 16 may be a hollow rod. In exemplary embodiments, extension rod 16 is a preform. Further, in exemplary embodiments, extension rod 16 is an extruded component. For example, extension rod 16 may advantageously be formed using a continuous process wherein the extruded component is provided in-line to a mandrel. At the mandrel, the extension rod 16 may be wrapped around the mandrel to form the preform shapes as discussed herein.

Extension rod 16 may each have a maximum outer diameter 17. The maximum outer diameter 17 may be suitable for use with particular conductors 100 having particular maximum outer diameters 102. In exemplary embodiments, the maximum outer diameter 17 may be between 0.4 inches and 1.5 inches, such as between 0.5 and 1.25 inches. In exemplary embodiments, the maximum outer diameter 17 is the same as the maximum outer diameter 13 and/or 15.

Extension rod 16 may include a first end portion 20 which includes a first end of the rod 16, and a second end portion 22 which includes a second opposite end of the rod 16. Further, rod 16 may include a mid-section 24 between the first end portion 20 and second end portion 22. The mid-section 24 of the extension rod 16 may in exemplary embodiments be a straight section of the rod 16. When the rod 16 is provided on a conductor, the mid-section 24 may be wrapped around the conductor 100 in a generally helical fashion. The first end portion 20 and second end portion 22 of the rod 16 may each include a hook section 40, as discussed herein with respect to rods 12, 14.

The hook section 40 of the first end portion 20 of the extension rod 16 may be connectable, such as directly connectable, to the hook section 40 of the first disruptor rod 12. The hook section 40 of the second end portion 22 of the extension rod 16 may be connectable, such as directly connectable, to the hook section 40 of the second disruptor rod 14. Hook sections 40 of the extension rod 16 may provide advantages as discussed above with respect to hook sections 40 of rods 12, 14.

The present disclosure is further directed to methods for reducing conductor 100 galloping. Such methods may, for example, generally involve installation of galloping motion disruptor(s) 10 on the conductor(s) 100.

For example, a method in accordance with the present disclosure may include attaching a helical gripping section 30 of a first disruptor rod 12 on the conductor 100, as generally discussed herein. A method in accordance with the present disclosure may further include attaching a helical gripping section 30 of a second disruptor rod 14 on the conductor 100, as generally discussed herein.

A method in accordance with the present disclosure may further include connecting the hook sections 40 of the first and second disruptor rods 12, 14 together, as generally discussed herein. Such connecting may, for example, occur after one or both attaching steps as discussed herein.

In some embodiments, the hook sections 40 of the first and second disruptor rods 12, 14 are directly connected together, as discussed herein. In other embodiments, the disruptor rods 12, 14 are indirectly connected together, as discussed herein. For example, a method in accordance with the present disclosure may further include wrapping a mid-section 24 of one or more extension rods 16 around the conductor 100, as generally discussed herein. The hook sections 40 of the first and second disruptor rods 12, 14 may be indirectly connected together by connecting, such as in exemplary embodiments directly connecting, the first end portion 20 hook section 40 of the extension rod 16 to the hook section 40 of the first disruptor rod 12 and connecting, such as in exemplary embodiments directly connecting, the second end portion 22 hook section 40 of the extension rod 16 to the hook section 40 of the second disruptor rod 14.

A method in accordance with the present disclosure may further include wrapping the mid-sections 24 of the first and second disruptor rods 12, 14 around the conductor 100, as generally discussed herein. Such wrapping may, for example, occur after the connecting steps as discussed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A galloping motion disruptor for a conductor, the galloping motion disruptor comprising: a first disruptor rod and a second disruptor rod, each of the first and second disruptor rods comprising a first end portion, a second end portion, and a mid-section between the first end portion and the second end portion, the first end portion comprising a helical gripping section, the second end portion comprising a hook section, wherein the hook sections of the first and second disruptor rods are connectable to each other, and an extension rod comprising a first end portion and a second end portion each comprising a hook section, wherein the hook sections of the first and second disruptor rods are indirectly connected together by the first end portion hook section of the extension rod connected to the hook section of the first disruptor rod and the second end portion hook section of the extension rod connected to the hook section of the second disruptor rod, and wherein the first disruptor rod, the second disruptor rod, and the extension rod are attachable to the conductor to disrupt galloping motion.

2. The galloping motion disruptor of claim 1, wherein the first disruptor rod and the second disruptor rods are each an extruded preform.

3. The galloping motion disruptor of claim 1, wherein the first disruptor rod and the second disruptor rod are each formed from a plastic.

4. The galloping motion disruptor of claim 1, wherein the first disruptor rod and the second disruptor rod are each formed from a polyvinyl chloride.

5. The galloping motion disruptor of claim 1, wherein the first disruptor rod and the second disruptor rod are each a generally solid rod.

6. The galloping motion disruptor of claim 1, wherein the first disruptor rod and the second disruptor rod each have a maximum outer diameter of between 0.4 inches and 1.5 inches.

7. The galloping motion disruptor of claim 1, wherein the hook section of each of the first disruptor rod and the second disruptor rod comprises a curved portion, an inwardly-extending linear portion, and an outwardly-extending linear portion.

8. The galloping motion disruptor of claim 1, wherein the hook section of each of the first disruptor rod and the second disruptor rod defines a gap, and wherein a minimum width of the gap is less than a maximum diameter of the one of the first disruptor rod or the second disruptor rod.

9. A method for reducing conductor galloping, the method comprising: attaching a helical gripping section of a first disruptor rod on a conductor, the first disruptor rod comprising a first end portion, a second end portion, and a mid-section between the first end portion and the second end portion, the first end portion comprising the helical gripping section, the second end portion comprising a hook section; attaching a helical gripping section of a second disruptor rod on the conductor, the second disruptor rod comprising a first end portion, a second end portion, and a mid-section between the first end portion and the second end portion, the first end portion comprising the helical gripping section, the second end portion comprising a hook section; connecting the hook sections of the first and second disruptor rods together; wrapping the mid-sections of the first and second disruptor rods around the conductor, and wrapping a mid-section of an extension rod around the conductor, the extension rod comprising a first end portion, a second end portion, and the mid-section between the first end portion and the second end portion, the first end portion and the second end portion each comprising a hook section, wherein the hook sections of the first and second disruptor rods are indirectly connected together by directly connecting the first end portion hook section of the extension rod to the hook section of the first disruptor rod and directly connecting the second end portion hook section of the extension rod to the hook section of the second disruptor rod.

10. The method of claim 9, wherein a maximum inner diameter defined by the helical gripping section of the first disruptor rod and a maximum inner diameter defined by the helical gripping section of the second disruptor rod are each less than a maximum outer diameter of the conductor.

11. The method of claim 9, wherein a maximum pitch of the mid-section of the first disruptor rod and a maximum pitch of the mid-section of second disruptor rod are each greater than a maximum pitch of the helical gripping section of the first disruptor rod and a maximum pitch of the helical gripping section of the second disruptor rod.

12. The method of claim 9, wherein the first disruptor rod and the second disruptor rods are each an extruded preform.

13. The method of claim 9, wherein the first disruptor rod and the second disruptor rod are each a generally solid rod.

14. The method of claim 9, wherein the first disruptor rod and the second disruptor rod each have a maximum outer diameter of between 0.4 inches and 1.5 inches.

15. The method of claim 9, wherein the hook section of each of the first disruptor rod and the second disruptor rod comprises a curved portion, an inwardly-extending linear portion, and an outwardly-extending linear portion.

16. The method of claim 9, wherein the hook section of each of the first disruptor rod and the second disruptor rod defines a gap, and wherein a minimum width of the gap is less than a maximum diameter of the one of the first disruptor rod or the second disruptor rod.

17. The method of claim 9, wherein the hook sections of the first and second disruptor rods are directly connected together.

* * * * *